Figure 1:
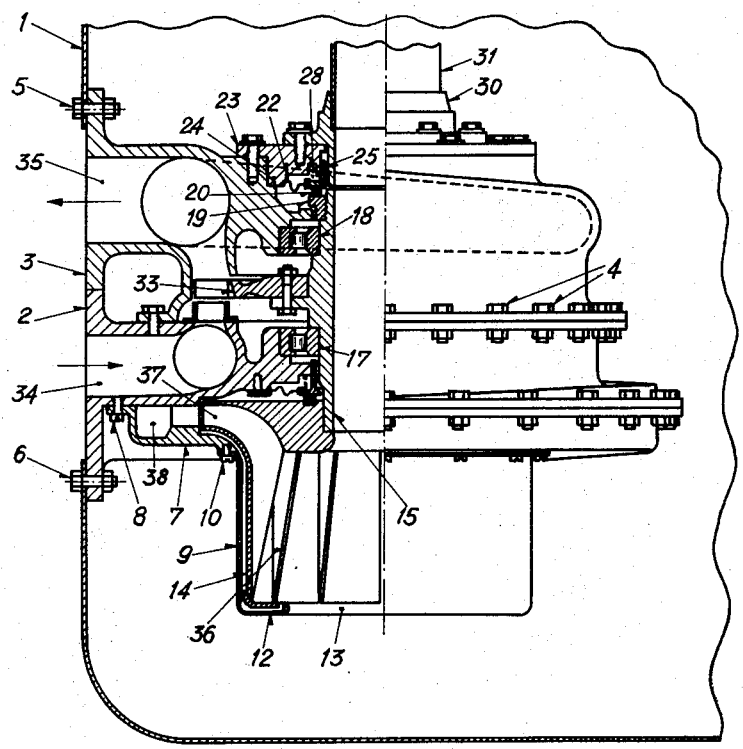

Nov. 2, 1954  G. C. DOELTER  2,693,148
IMPULSE FEED PUMP FOR AIRCRAFT
Filed May 13, 1949

GANDOLPH C. DOELTER
Inventor

By Richard E. Leier
Attys.

United States Patent Office 2,693,148
Patented Nov. 2, 1954

2,693,148

IMPULSE FEED PUMP FOR AIRCRAFT

Gandolph C. Doelter, Paris, France, assignor to Vadolt Trust, Vaduz, Liechtenstein, a company of Liechtenstein Application May 13, 1949, Serial No. 93,064

1 Claim. (Cl. 103—87)

The present invention relates to a separator booster pump for delivering the propellant, such as volatile or boiling liquids, from the tank to the engine in aircraft which are intended for flights at high altitude. Such pumps must not only supply the boiling fuel, but at the same time separate the vapours which are combined with the fluid fuel and which are developed to a large extent by the lowering of the ambient pressure during the rapid climbing of these aircraft, so that the fuel supplied to the engine is, as far as possible, free from vapours.

According to the invention there is provided a separator booster pump arranged in a fuel tank, for supplying the propellant from the tank to the fuel system of an aircraft engine or engines which are intended for flights at high altitude, in which is included a fuel feeding means comprising, a centrifugal separator drum which is open at the bottom and has an impeller on top, the drum also having a hollow shaft and being provided internally with impeller blades, which blades set the fuel in rotation in the drum, thus separating the vapours and gases from the liquid which is then pumped by the impeller to an annular volute, forcing the separated vapours, gases and the air through the hollow driving shaft of the drum, out of the pump.

The drive of the centrifugal drum is conveniently effected by an air turbine which is operated, for example, by compressed air.

In the accompanying drawing, two constructional examples of separator booster pumps embodying the invention are illustrated by way of example, these examples differing from one another only in the arrangement of the turbine.

Figure 2:
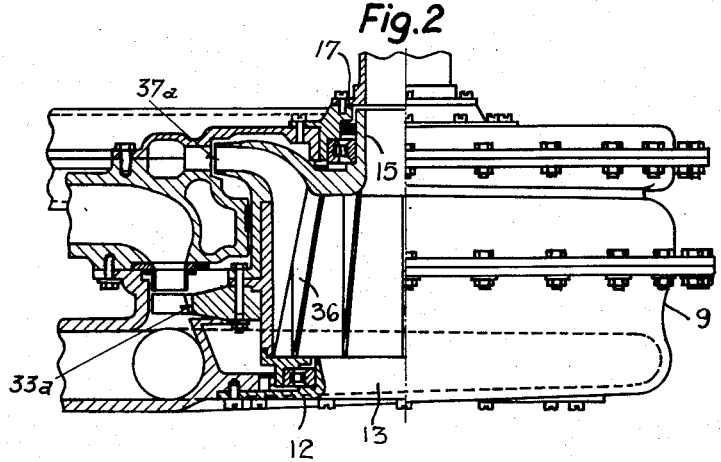

In the drawing:

Figure 1 shows a separator booster pump, partly in elevation and partly in section, in which the driving turbine is arranged above the centrifuge outlet, whereas Figure 2 shows, partly in elevation and partly in section, the turbine built in below the impeller of a separator booster pump. The embodiment of the invention shown in Figure 2 renders possible a shallower form of construction of the booster pump.

With reference to the drawing, there is arranged in a tank 1, a housing 2 which is connected with a housing 3 by means of bolts 4 and which is secured to the inside wall of the tank by means of bolts 5 and 6. Secured, by screws 8, to the housing 2 is a ring 7 onto which a casing 9 is tightly secured by screws 10. The casing 9 has an inwardly directed flange 12 which is provided with an opening 13 of smaller diameter than the outside diameter of a centrifugal separator drum 14. This centrifugal drum is pressed onto a pipe or hollow shaft 15, which is mounted in the housings 2 and 3 by means of the roller bearings 17 and 18, the pipe or hollow shaft 15 being sealed off from the fuel in the tank by a ring 19, a carbon packing ring 20 and a diaphragm 22. The diaphragm 22 and the flange 23 are secured to a projection 24 on the housing 3, the inner peripheral edge of the diaphragm being fixed in a sliding bush 25 in which the carbon packing ring 20 is also retained. By means of a spring 28, the bush 25 and thus the carbon ring 20 are pressed onto the ring 19, the pipe 15 thus being sealed towards the exterior. Such a seal is needed in order to build up the pressure in the drum, which in turn separates the liquid from the vapour bubbles.

A ring 30, in which is firmly fitted a pipe 31 which leads to a position above the level of the fuel, is secured on the hollow shaft 19. A turbine blade wheel 33 in a turbine compartment of the casing is fixed to the pipe 15 and air, which is blown in through a passage 34 and which escapes through a passage 35, drives the turbine blade wheel and, via the pipe 15, the centrifugal drum 14. Impeller blades 36, by which the volatile or boiling fuel entering through the opening 13 is set in rotation, are arranged on the inner wall of the centrifugal separator drum 14. Due to centrifugal force, this fuel is pumped through an annular outlet slot 37 into a passage or volute 38, from which the fuel is led to the engine fuel system through pipes which are not shown in the drawing.

In operation, fuel from the tank 1 passes into the interior of the centrifugal separator drum 14 through the opening 13. By means of the blades 36, the fuel is set in rotation so that it is centrifuged up and outwardly through the passage 37 due to centrifugal force, and passes into the passage 38 from which pipes lead to the fuel system of the engine or engines. Due to the rotation of the volatile fuel which may become boiling under certain altitude flight conditions in the separator drum 14, the centrifugal forces acting on the liquid or the vaporous particles of the fuel are very different. The heavier liquid particles under the influence of stronger centrifugal forces urge the gaseous particles against their much weaker centrifugal force back to the center of the drum, creating a vortex, which is filled with vapors or gases separated from the liquid fuel. The vapors, gases or air contained in the vortex escape upwardly through the pipe 15 and the pipe 31 towards the upper space of the fuel tank.

The driving of the centrifuge 14 may conveniently be effected by a turbine which can be driven by means of a gaseous or liquid medium. The driving of the centrifugal drum by means of a turbine is to be preferred to an electrical drive, not only because of space and power needed but also for safety reasons, more especially because of the danger of explosion due to possible sparking at the engine.

The construction of Figure 2 differs from that of Figure 1 in that the turbine wheel 33a is arranged beneath the outlet passage 37a of the exit impeller on top of the centrifugal drum, so that the feed pump shown in Figure 2 is capable of being made of substantially lesser height than that shown in Figure 1.

I claim:

A separator booster pump for a tank containing a volatile liquid for a fuel system, the pump comprising a tank, a housing adapted to be located within said tank and provided with a lower opening adapted to communicate with the interior of the tank, a vertically disposed hollow shaft rotatably mounted in said housing, a centrifugal separator drum telescoped within said housing and secured to said shaft for rotation therewith, a plurality of axially extended blades secured to the interior of the drum, with the blades inclined from the periphery of the drum toward the axis thereof, said drum having a lower opening and a radially extending annular outlet slot, whereby the interior of the drum communicates with said lower opening of the housing and with the interior of said hollow shaft, said blades providing a flow path between the lower opening in the drum and the interior of the hollow shaft and the radially extending annular outlet slot of the drum, a turbine blade wheel fixed to said shaft and located within said housing and means connected with said housing and supplying compressed air to said turbine blade wheel, and said housing having formed therein a passage communicating with said outlet slot.

References Cited in the file of this patent

UNITED STATES PATENTS

| Number | Name | Date |
| --- | --- | --- |
| 1,345,895 | Seguin | July 6, 1920 |
| 1,472,560 | Griffiths | Oct. 30, 1923 |
| 2,369,440 | Curtis | Feb. 13, 1945 |
| 2,382,412 | Grey | Aug. 14, 1945 |
| 2,392,128 | Dinsmore | Jan. 1, 1946 |
| 2,393,691 | Karassik | Jan. 29, 1946 |
| 2,418,221 | Curtis | Apr. 1, 1947 |
| 2,422,956 | Edwards | June 24, 1947 |